No. 740,101. PATENTED SEPT. 29, 1903.
W. A. DICK.
METHOD OF OPERATING ELECTRIC MOTORS.
APPLICATION FILED DEC. 29, 1902.
NO MODEL. 2 SHEETS—SHEET 1.

WITNESSES:
C. L. Belcher
Birney Hines

INVENTOR
William A. Dick
BY
Wesley G. Carr
ATTORNEY.

No. 740,101. PATENTED SEPT. 29, 1903.
W. A. DICK.
METHOD OF OPERATING ELECTRIC MOTORS.
APPLICATION FILED DEC. 29, 1902.
NO MODEL. 2 SHEETS—SHEET 2.
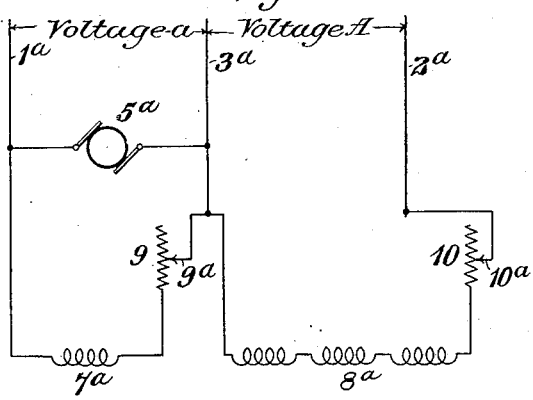
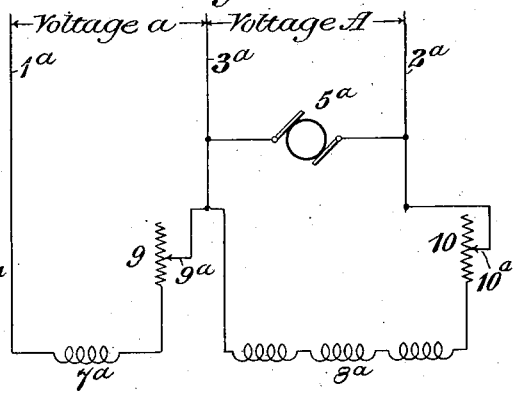
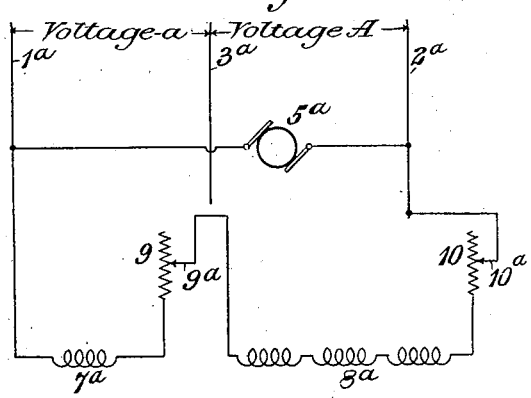
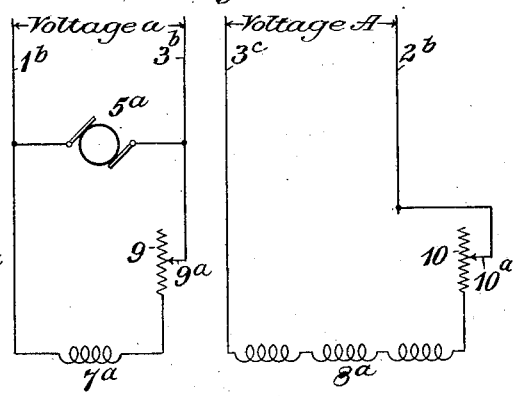
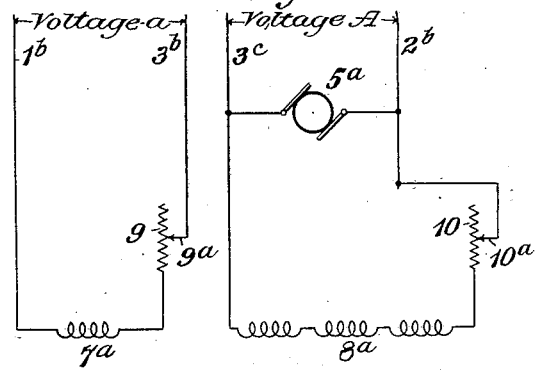
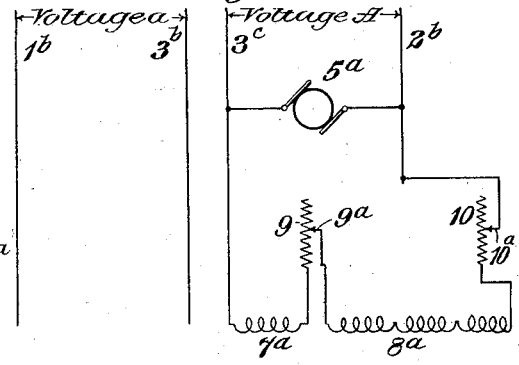
WITNESSES:
C. L. Belcher
Birney Hines
INVENTOR
William A. Dick
BY
Wisely L. Carr
ATTORNEY.

No. 740,101.
Patented September 29, 1903.

UNITED STATES PATENT OFFICE.

WILLIAM A. DICK, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF OPERATING ELECTRIC MOTORS.

SPECIFICATION forming part of Letters Patent No. 740,101, dated September 29, 1903.

Application filed December 29, 1902. Serial No. 137,072. (No model.)

*To all whom it may concern:*

Be it known that I, WILLIAM A. DICK, a citizen of the United States, residing at Wilkinsburg, in the county of Allegheny and State of Pennsylvania, have invented a new and useful Improvement in Methods of Operating Electric Motors, of which the following is a specification.

My invention relates to the operation of electric motors at variable speeds, and it has for its object to provide a method which may successfully and economically utilize the energy of a plurality of circuits of different voltages, so as to provide a wide range of motor speeds.

In practicing my invention I propose to utilize either a three-wire circuit carrying either two or three different voltages or a plurality of separate circuits having different voltages in such manner as to make effective use of the different voltages more advantageously than previous practice has permitted.

In the accompanying drawings I have illustrated diagrammatically certain principal steps in my method.

Figure 1:
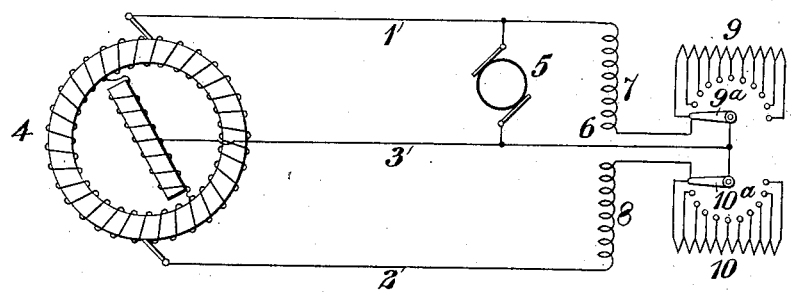
Figure 2:
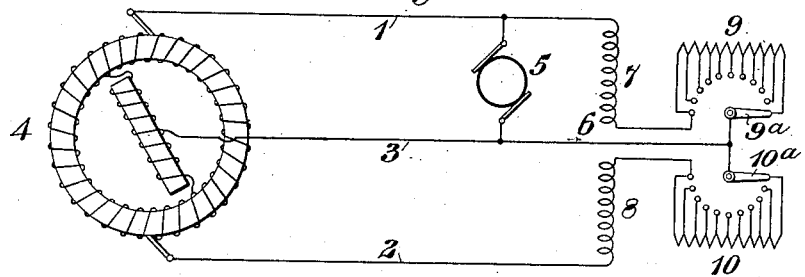
Figure 3:
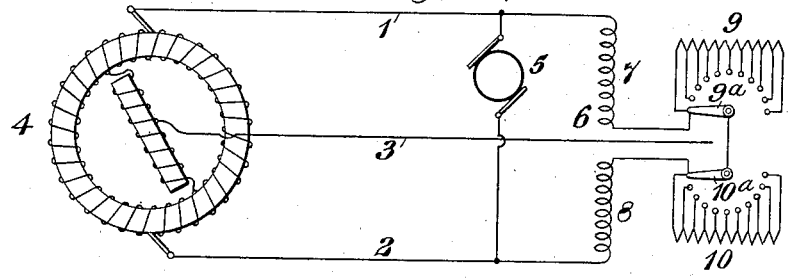
Figure 4:
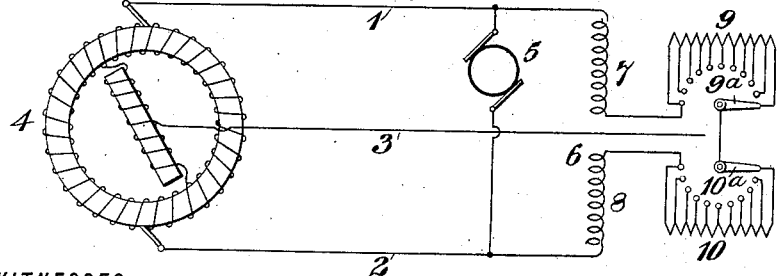

Figure 1 shows a three-wire circuit in which a motor is connected for operation at minimum speed. Fig. 2 is a similar view with the motor connected to operate at a higher speed. Fig. 3 is a similar view showing a motor connected for a second higher speed, and Fig. 4 is a similar view showing a motor connected for maximum speed. Fig. 5 is a diagram of a three-wire circuit having different voltages between the respective main conductors and the intermediate conductor and showing a motor-armature connected to receive the minimum voltage. Figs. 6 and 7 are views similar to Fig. 5, but respectively showing the motor-armature connected to receive the intermediate and the maximum voltage. Figs. 8, 9, and 10 are views similar to Figs. 5, 6, and 7, but showing two separate two-wire circuits in lieu of a three-wire circuit.

Referring first to Figs. 1 to 4 of the drawings, the main conductors 1 and 2 and the intermediate or neutral conductor 3 may be supplied from a single generator 4, properly designed and constructed, as set forth, for example, in patent to Michael von Dolivo-Dobrowolsky, No. 513,006, dated January 16, 1894, or these conductors may be supplied from two generators, in accordance with the well-known Edison three-wire system, the single generator being preferred, however, as involving less expense and complication.

The motor, or each of the motors if several are operated from the circuit supplied by the generator 4, comprises an armature 5 and a field-magnet 6, the winding of which is divided into two equal parts 7 and 8, it being understood that the coils comprising one half of the winding will be applied to pole-pieces which alternate with those carrying the coils constituting the other half of the winding in order that the magnetic circuits may be properly balanced. The winding 7 is connected across the circuit 1 3 by means of a variable rheostat 9 and the winding 8 is connected across the circuit 2 3 by means of a variable rheostat 10.

In Fig. 1 I have shown the apparatus arranged so that none of the resistance of either rheostat is included in circuit, and consequently the motor has a field of maximum strength, and its armature being connected across the circuit which provides a minimum voltage the motor will operate at a minimum speed. In order to gradually increase the speed of the motor, either or both of the switch-arms 9ª and 10ª of the rheostats 9 and 10 will be moved over the corresponding stationary contacts to gradually include the resistance in the corresponding field-magnet circuit.

As above suggested, the resistance of the rheostats 9 and 10 may be cut into circuit either simultaneously or independently, and, in fact, either of the field-magnet circuits may be opened and the motor will still continue to be operative.

In Fig. 2 the connections are the same as those shown in Fig. 1 except that the resistance of each of the rheostats 9 and 10 is in circuit with the corresponding field-magnet winding, and consequently the motor has a minimum field strength for this connection of windings and the speed is correspondingly greater than with the arrangement shown in Fig. 1.

In Fig. 3 the armature 5 is connected across the circuit 1 2, and consequently has impressed upon it double the voltage of the circuit 1 3, across which it was previously connected. The field-magnet windings 7 and 8 are connected in series across the same circuit 1 2 without external resistance, and consequently the field is of maximum strength for this connection, and the motor will run at a speed corresponding to the higher voltage applied to the armature. The speed of the motor may be now gradually increased by moving the rheostat-arms $9^a$ and $10^a$ either simultaneously or successively to gradually weaken the field of the motor until the resistance is all in circuit, when the speed will be maximum. This condition is illustrated in Fig. 4.

Referring now to Figs. 5 to 7 of the drawings, the three-wire circuit $1^a$ $2^a$ $3^a$ may be supplied from a single generator properly equipped or associated with a suitable balancing means or by two generators connected and operated in accordance with the well-known Edison three-wire system of distribution, as has been already set forth in connection with what is shown in the preceding figures of the drawings. In this case, however, the circuits $1^a$ $3^a$ and $2^a$ $3^a$ are supplied with different voltages, which are designated on the drawings as voltage $a$ and voltage A, the former being materially less than the latter. As here indicated, the two voltages are such that substantially one-fourth of the field-magnet winding is connected across the circuit $1^a$ $2^a$ and the remainder of the winding is connected across the circuit $2^a$ $3^a$. If a four-pole motor be employed, the portion of the winding connected across circuit $1^a$ $2^a$ will be one coil (here designated as $7^a$) and the portion connected across circuit $2^a$ $3^a$ will be three coils, (here designated as $8^a$.) Different voltages and a different apportionment of the winding with reference to the circuits may of course be employed.

As represented in Fig. 5, the armature $5^a$ is connected across the circuit $1^a$ $3^a$ of minimum voltage, and substantially one-half of each of the resistances 9 and 10 is connected in the corresponding field-magnet circuit, it being intended, however, as in the case already described, to start the motor with no external resistance in circuit and to gradually introduce the resistance in order to increase the motor speed to the point where the armature is to be connected across the circuit of the next higher voltage, this circuit in the present case being the circuit $2^a$ $3^a$ and this connection of the armature being indicated in Fig. 6. In this figure the resistances 9 and 10 are also illustrated as partially included in the field-magnet circuits by means of the movable contact members $9^a$ and $10^a$. As in the preceding cases, this indicates an intermediate speed for this voltage.

In Fig. 7 the armature is shown as connected between the conductors $1^a$ and $2^a$, and therefore as having impressed upon it the maximum voltage, which is the sum of the voltages of the circuits $1^a$ $3^a$ and $2^a$ $3^a$. The field-magnet coils are here also shown as all connected in series, the resistances 9 and 10 being shown as partially included, and therefore as representing an intermediate speed for this connection of the armature and field-magnet windings. The inclusion of all of the resistances 9 and 10 in the field-magnet circuit obviously corresponds to maximum speed.

Instead of employing three-wire circuits for securing either two or three voltages I may employ separate circuits supplied from independent generators of different voltage. This I have illustrated in Figs. 8, 9, and 10, the circuit $1^b$ $3^b$ being supplied with the lower voltage $a$ and the circuit $2^b$ $3^c$ with the higher voltage A. As indicated in Fig. 8, the armature is connected across the circuit $1^b$ $3^b$, and a portion of the field-magnet winding (here indicated as substantially one-fourth,) is also connected across this circuit, this portion of the winding being designated as $7^a$. The remainder of the field-magnet winding (designated as $8^a$) is connected across the circuit $2^b$ $3^c$, each of the field-magnet circuits being provided with external resistances, (designated, respectively, as 9 and 10,) the active length of which is varied by means of movable members $9^a$ and $10^a$ in the manner already described.

In Fig. 9 are represented the circuit connections for a higher speed, in which the armature $5^a$ is connected across the higher voltage-circuit $2^b$ $3^c$, the connection of the field-magnet circuits being the same as in Fig. 8.

In Fig. 10 the armature is connected the same as in Fig. 9 across the circuit $2^b$ $3^c$, but the field-magnet winding is connected all in series across the same circuit $2^b$ $3^c$.

It will be understood that the resistances 9 and 10 will be adjusted to vary the motor field-magnet strength in accordance with the different speeds desired in the manner already described in detail in connection with what is illustrated in Figs. 1 to 4.

While I have illustrated shunt-windings only for the field-magnet of the motor, it will be understood that my invention is not limited to the operation of shunt-wound motors, since similar results may be secured by proper connection and adjustment of the circuits of compound windings. It will be also understood that the invention is not limited to specific voltages and arrangements of circuits or to specific divisions of the armature-windings with reference to the circuits of different voltage, provided an arrangement be adopted and employed which will be satisfactorily operative and be such as to embody the essential steps constituting the method which will be hereinafter specifically pointed out in the claims.

I claim as my invention—

1. The method of operating an electric motor at variable speeds from circuits having different voltages, which consists in supplying a relatively low voltage to the armature and to a portion of the field-magnet winding for minimum speed, then progressively introducing resistance into the field-circuit, then cutting out the resistance and supplying a higher voltage to the armature and to all the field-magnet coils in series and finally progressively introducing resistance into the field-circuit.

2. The method of operating an electric motor at variable speeds from circuits having different voltages, which consists in supplying the lowest voltage to the armature and to a portion of the field-magnet coils, then progressively introducing resistance into each field-circuit, then simultaneously cutting out the resistance and supplying the armature and entire field-winding with a higher voltage and finally progressively introducing resistance into the field-circuit.

3. The method of operating an electric motor at variable speeds from circuits having different voltages, which consists in connecting the armature and a portion of the field-magnet winding across a low-voltage circuit and another portion of the field-magnet winding across another low-voltage circuit and varying the resistance of one or both of the field-magnet circuits for one range of speed and connecting the armature and the entire field-magnet winding across a high-voltage circuit and varying the resistance of the field-magnet circuit for another range of speed.

4. The method of operating an electric motor at variable speeds, which consists in connecting the armature and a portion of the field-magnet winding across a low-voltage circuit and increasing the resistance of the field-magnet circuit for one range of speed and then connecting the armature and the entire field-magnet winding across a high-voltage circuit and increasing the resistance of the field-magnet circuit for another range of speed.

5. The method of operating an electric motor at variable speeds, which consists in connecting the armature and a portion of the field-magnet winding across a low-voltage circuit and increasing the resistance of the field-magnet circuit for one range of speed, connecting the armature and a greater length of the field-magnet winding across a higher-voltage circuit and increasing the resistance of the field-magnet circuit for a higher range of speed and connecting the armature and the entire field-magnet winding across a still-higher-voltage circuit and increasing the resistance of the field-magnet circuit for a still higher range of speed.

6. The method of operating an electric motor at variable speeds which consists in supplying a relatively low voltage to the armature and to a portion of the field-magnet winding, then progressively introducing resistance into the field-magnet circuit, then cutting out the resistance and supplying a higher voltage to the armature and to a portion of the field-magnet winding, then progressively introducing resistance into the field-magnet circuit, then cutting out the resistance and supplying a maximum voltage to the armature and to the entire field-magnet winding and finally progressively inserting the resistance.

7. The method of operating an electric motor at variable speeds from circuits having different voltages which consists in supplying the armature and a portion of the field-magnet winding with energy from the circuit having the lowest voltage and without external resistance for minimum speed, supplying the armature and the entire shunt-winding, having maximum external resistance in its circuit, with energy from the circuit having the highest voltage for maximum speed and varying resistance of the field-magnet circuit or circuits either with or without change of armature-voltage for intermediate speeds.

8. The method of operating an electric motor at variable speeds from circuits having different voltages which consists in transferring the armature from one circuit to another and at the same time apportioning the field-magnet winding to the respective circuits in accordance with the voltages of said circuits and effecting intermediate changes in speed by varying the amount of resistance in the field-magnet circuit or circuits.

In testimony whereof I have hereunto subscribed my name this 17th day of December, 1902.

WILLIAM A. DICK.

Witnesses:
 JAMES B. YOUNG,
 BIRNEY HINES.